(12) United States Patent
Ju et al.

(10) Patent No.: US 12,103,435 B2
(45) Date of Patent: Oct. 1, 2024

(54) MODEL OF AUTOMOTIVE CABIN BASED ON BIOMETRIC IDENTIFICATION TECHNOLOGY

(71) Applicant: CATARC Software Testing (Tianjin) Co., Ltd., Tianjin (CN)

(72) Inventors: Weinan Ju, Tianjin (CN); Zhipeng Sun, Tianjin (CN); Lijuan Cao, Tianjin (CN); Guokai Jiang, Tianjin (CN); Longfei He, Tianjin (CN); Baofeng Huo, Tianjin (CN); Jiaoyang Liu, Tianjin (CN); Quan Wen, Tianjin (CN); Liping Liu, Tianjin (CN); Qiujun Zhao, Tianjin (CN); Manna Wang, Tianjin (CN); Yongjian Zhu, Tianjin (CN); Shimeng Wang, Tianjin (CN); Yu Su, Tianjin (CN)

(73) Assignee: CATARC Software Testing (Tianjin) Co., Ltd., Tianjin (CN)

( * ) Notice: Subject to any disclaimer, the term of this patent is extended or adjusted under 35 U.S.C. 154(b) by 260 days.

(21) Appl. No.: 17/660,617

(22) Filed: Apr. 25, 2022

(65) Prior Publication Data

US 2022/0340049 A1 Oct. 27, 2022

(30) Foreign Application Priority Data

Apr. 26, 2021 (CN) .......................... 202110455502.3

(51) Int. Cl.
*B60N 2/02* (2006.01)
*G06N 3/084* (2023.01)

(52) U.S. Cl.
CPC .......... *B60N 2/0244* (2013.01); *G06N 3/084* (2013.01); *B60N 2/0268* (2023.08); *B60N 2/0272* (2023.08)

(58) Field of Classification Search
CPC .. B60N 2/0244; B60N 2/0268; B60N 2/0272; G06N 3/084
See application file for complete search history.

(56) References Cited

U.S. PATENT DOCUMENTS

| 10,747,860 | B2* | 8/2020 | Kingsbury | G06F 21/316 |
| 2005/0149461 | A1* | 7/2005 | Kennedy | B60N 2/002 702/101 |
| 2015/0366350 | A1* | 12/2015 | Di Censo | A61B 5/6893 700/275 |
| 2020/0242421 | A1* | 7/2020 | Sobhany | B60K 35/10 |
| 2020/0282867 | A1* | 9/2020 | Yi | B60N 2/0244 |

\* cited by examiner

*Primary Examiner* — Jelani A Smith
*Assistant Examiner* — Nada Mahyoob Alqaderi
(74) *Attorney, Agent, or Firm* — AVEK IP, LLC

(57) ABSTRACT

In some embodiments, the present disclosure provides an algorithm for a data-driven intelligent adaptive model of an automobile cab based on a biometric identification technology. The algorithm includes the following steps: acquiring driving posture data, the driving posture data including driver information, automobile man-computer parameter information, and seat position information; building a feature extraction model of the driving posture data and screening feature vectors playing a significant role in predicting a seat position by the feature extraction model; building a prediction model of a comfortable seat position by a back propagation (BP) neural network and inputting the screened feature vectors to perform training on the prediction model; and inputting specific feature vectors to obtain the seat position information and accordingly adjust the seat position.

17 Claims, 6 Drawing Sheets

| type | Symbol | Meaning |
|---|---|---|
| Driver information | Data Gender | Gender |
| | Stature/mm | Stature |
| | Age | Age |
| | Weight/kg | Weight |
| Man-computer essential attributes | AHP | Accelerator Heel Point |
| | H point | Hip Point (Intersection point of a torso line and a thigh line of a human body) |
| | SgRP | Seating Reference Point |
| | BOFRP | Ball Of Foot Reference Point (Point located on a center line of a stepping plane and 200 mm away from a heel point) |
| Automobile man-computer parameter information | $H30_{SJ}$/mm | Vertical distance between an SgRP and the heel point of a driver in a design state |
| | L1/mm | X-coordinate of a BOFRP |
| | L6/mm | Distance between the BOFRP and a center of a steering wheel in an X-axis direction |
| | H8/mm | Vertical height of an AHP |
| | A19/° | Inclination angle of a seat track line |
| | TL23/mm | Horizontal adjustment stroke of an H point during normal driving |
| | H17/mm | Distance between the AHP and the center of the steering wheel |
| | L53/mm | Horizontal distance between a front SgRP and the AHP |
| | W7/mm | Y-coordinate of the center of the steering wheel |
| | A18/° | Inclination angle of the steering wheel |
| | W9/mm | Diameter of the steering wheel |
| Seat position information | X/mm | Horizontal distance between the H point and a BOF point of the driver |
| | H30/mm | Vertical distance, predicted by a model, between the H point and the heel point of the driver |

FIG. 4

| Model | MAE(mm) | | Accuracy (%) | | SD | |
|---|---|---|---|---|---|---|
| | H30 | X | H30 | X | H30 | X |
| BP neural network | 18.82 | 19.76 | 93.37 | 97.47 | 14.11 | 15.98 |

| Model | Mean value (mm) of MAE | | Mean value of SD | |
|---|---|---|---|---|
| | H30 | X | H30 | X |
| MEC-BP | 18.96 | 18.79 | 12.09 | 12.13 |
| BP neural network | 19.99 | 19.98 | 14.14 | 16.18 |

FIG. 7

| Approach | MAE (mm) | Accuracy (%) |
|---|---|---|
| Driver selected seat position for a person | 67.05 | 91.12 |
| Driver selected seat position set by an SAE man-computer system | 157.13 | 79.54 |
| BP neural network | 19.76 | 97.47 |

FIG. 8

MODEL OF AUTOMOTIVE CABIN BASED ON BIOMETRIC IDENTIFICATION TECHNOLOGY

CROSS REFERENCE TO RELATED APPLICATION

This application claims priority to Chinese Patent Application No. 202110455502.3, filed on Apr. 26, 2021, the disclosure of which is incorporated by reference herein in its entirety.

FIELD OF THE DISCLOSURE

The disclosure relates generally to the technical field of human-computer interactive and intelligent devices of automobiles. More specifically, the disclosure relates to algorithms for data-driven intelligent adaptive models of automobile cabs based on biometric identification technologies.

BACKGROUND

A way to achieve high comfort of automobiles by adopting human-computer interactive and intelligent design has become one of the key research topics in automobile industry. Society of Automotive Engineers (SAE) man-computer systems are typically adopted by national automobile enterprises to research adjustments on sitting postures in automobile cabs. However, the SAE man-computer systems are equivalent to models built for western people. Due to the difference in races and living habits, or other reasons, driver selected seat positions set by the SAE man-computer systems are not exactly matched with a person, resulting in reduction of driving comfort and driving safety.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an algorithm for a data-driven intelligent adaptive model of an automobile cab based on a biometric identification technology. The algorithm includes the following steps.

Acquiring driving posture data, the driving posture data including driver information, automobile man-computer parameter information, and seat position information.

Building a feature extraction model of the driving posture data and screening feature vectors playing a significant role in predicting a seat position by the feature extraction model.

Building a prediction model of a comfortable seat position by a back propagation (BP) neural network and inputting the screened feature vectors to perform training on the prediction model.

Inputting specific feature vectors to obtain the seat position information and accordingly adjust the seat position.

Optionally, the driver information includes a gender parameter, a stature parameter, an age parameter, and a weight parameter. The automobile man-computer parameter information includes an H30SJ parameter, an L1 parameter, an L6 parameter, an H8 parameter, an A19 parameter, a TL23 parameter, an H17 parameter, an L53 parameter, a W7 parameter, an A18 parameter, and a W9 parameter.

Here, the H30SJ parameter represents a vertical distance between an SgRP and a heel point of a driver in a design state, the L1 parameter represents an X-coordinate of a BOFRP, the L6 parameter represents a distance between the BOFRP and a center of a steering wheel in an X-axis direction, the H8 parameter represents a vertical height of an AHP, the A19 parameter represents an inclination angle of a seat track line, the TL23 parameter represents a horizontal adjustment stroke of an H point during normal driving, the H17 parameter represents a distance between the AHP and the center of the steering wheel, the L53 parameter represents a horizontal distance between a front SgRP and the AHP, the W7 parameter represents a Y-coordinate of the center of the steering wheel, the Al8 parameter represents an inclination angle of the steering wheel, and the W9 parameter represents a diameter of the steering wheel.

The AHP represents an accelerator heel point, the H point represents an intersection point of a torso line and a thigh line of a human body, the SgRP represents a seating reference point, and the BOFRP represents a ball of foot reference point.

The seat position information includes an X parameter and an H30 parameter. The X parameter represents a horizontal distance between the H point and a BOF point of the driver, and the H30 parameter represents a vertical distance, predicted by a model, between the H point and the heel point of the driver.

Optionally, the acquired driving posture data is preprocessed through following steps. Clustering the driving posture data, detecting an outlier by calculating a Euclidean distance between a sample point and a clustering center, and removing the outlier to obtain preprocessed sampled driving posture data.

Optionally, the step of building the feature extraction model of the driving posture data includes the following steps. Selecting features of the driving posture data through a least absolute shrinkage and selection operator (Lasso) regression algorithm; and screening, by cluster analysis based on correlation, the features selected through the Lasso regression algorithm.

Optionally, the feature extraction model includes following Python codes:

```
cv_ridge=pd.Series(cv_ridge,index=alphas);
cv_ridge.plot(title="Validation");
linreg=MultiTaskLassoCV( ); and
linreg.fit(X_train, Y_train).
```

Optionally, the screened feature vectors playing the significant role in predicting the seat position includes: the gender parameter, the stature parameter, the weight parameter, the H30SJ parameter, the H8 parameter, and the L53 parameter.

Optionally, the step of building the prediction model of the comfortable seat position by the BP neural network and inputting the screened feature vectors to perform training on the prediction model includes the following steps.

Adopting the screened feature vectors as data samples.

Randomly extracting 70% of data samples as a training set of a fitting model and adopting remaining 30% of data samples as a testing set for validating an error value of the fitting model.

Building a prediction model of a comfortable driving position by the BP neural network. After traversal is performed, an optimal number of neurons on a hidden layer is 9; and training the prediction model of the comfortable driving position by taking the gender parameter, the stature parameter, the weight parameter, the H30SJ parameter, the H8 parameter, and the L53 parameter as input variables, taking the X parameter and the H30 parameter as output variables, and setting the number of the neurons on the hidden layer as 9.When all the samples in the training are subjected to 26 rounds of forward and backward propagation, adjusted weights meet a requirement for reduction of coefficients of the variables, and errors of the training set, the testing set, and a validation set are reduced to be on the order of 0.01.

Optionally, the prediction model of the comfortable driving position is built through a software. The prediction model of the comfortable driving position includes following codes:

```
net=newff(Pn_train, Tn_train,S2);
net=train(net,Pn_train, Tn_train); and
Tn_sim=sim(net,Pn_test).
```

Optionally, the step of inputting specific feature vectors to obtain the seat position information and accordingly adjust the seat position includes the following steps.

Acquiring the gender parameter, the stature parameter, the weight parameter, the H30SJ parameter, the H8 parameter, and the L53 parameter of the driver.

Inputting the gender parameter, the stature parameter, the weight parameter, the H30SJ parameter, the H8 parameter, and the L53 parameter of the driver to the prediction model of the comfortable seat position to obtain the X parameter and the H30 parameter in the seat position information. The prediction model of the comfortable seat position is built by the BP neural network, and acquiring a comfortable vertical position parameter and a comfortable horizontal position parameter according to the X parameter and the H30 parameter.

Adjusting the seat position according to the comfortable vertical position parameter and the comfortable horizontal position parameter.

BRIEF DESCRIPTION OF THE DRAWINGS

Illustrative embodiments of the present disclosure are described in detail below with reference to the figures.

FIG. 4 is a schematic diagram of the automobile cab in the embodiment of the present disclosure according to an embodiment of the disclosure.

FIG. 7 is a flow chart of a memory-efficient convolution-back propagation (MEC-BP) neural network in the algorithm for a data-driven intelligent adaptive model of an automobile cab based on a biometric identification technology in the embodiment of the present disclosure according to an embodiment of the disclosure.

FIG. 8 is a schematic diagram showing test results of a model of the MEC-BP neural network in the algorithm for a data-driven intelligent adaptive model of an automobile cab based on a biometric identification technology in the embodiment of the present disclosure according to an embodiment of the disclosure.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Embodiment 1

The technical problem to be solved by this embodiment is that a driver selected seat position set by an SAE man-computer system in the process of researching a posture adjustment in a cab by current automobile enterprises is not exactly matched with a person, causing reduction of driving comfort and driving safety.

Figure 1:
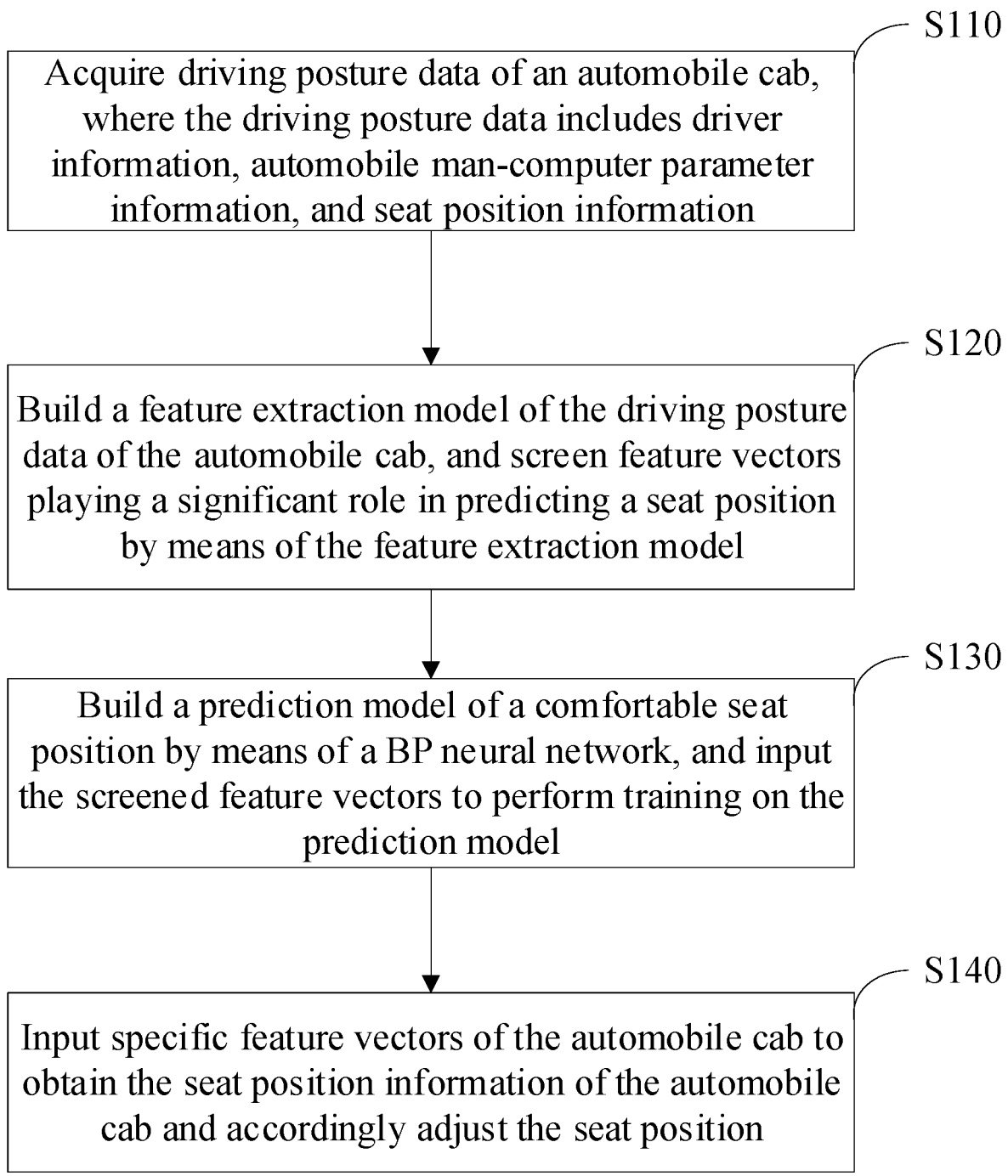
FIG. 1 is a flow chart of an algorithm for a data-driven intelligent adaptive model of an automobile cab based on a biometric identification technology in an embodiment of the present disclosure according to an embodiment of the disclosure.

To solve the above technical problem, this embodiment provides an algorithm for a data-driven intelligent adaptive model of an automobile cab based on a biometric identification technology. As shown in FIG. 1, the algorithm includes steps S110-S140.

S110, Acquire driving posture data of an automobile cab, where the driving posture data includes driver information, automobile man-computer parameter information, and seat position information.

The driver information includes a gender parameter, a stature parameter, an age parameter, and a weight parameter.

Figure 3:
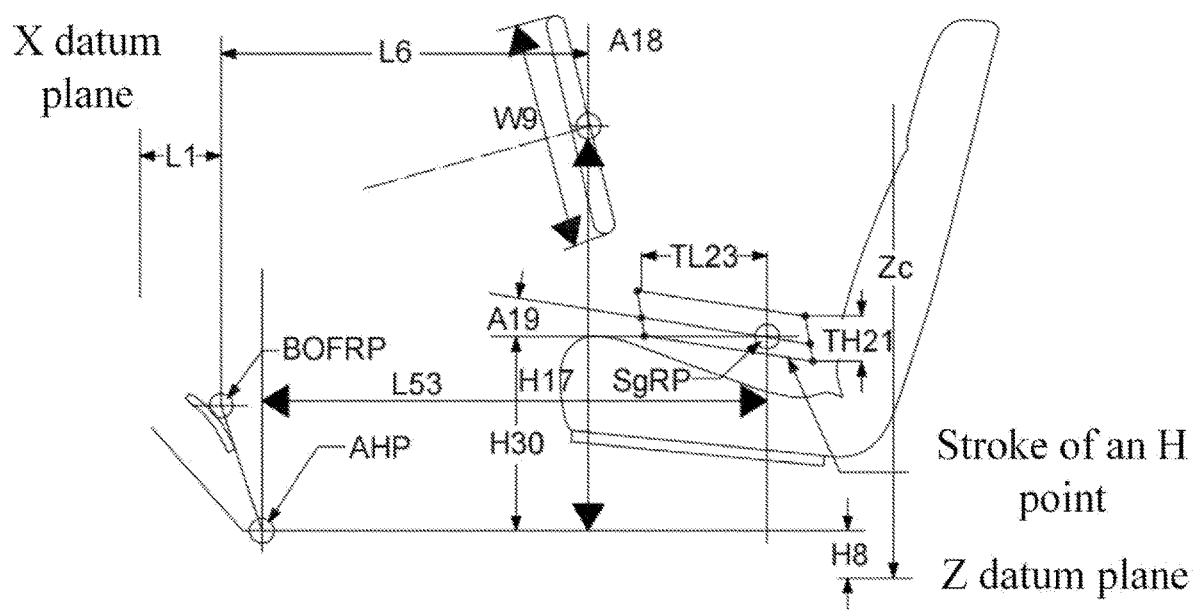
FIG. 3 is a schematic diagram of automobile man-computer parameter information of the automobile cab in the embodiment of the present disclosure according to an embodiment of the disclosure.

As shown in FIG. 3, the automobile man-computer parameter information includes an H30SJ parameter, an L1 parameter, an L6 parameter, an H8 parameter, an A19 parameter, a TL23 parameter, an H17 parameter, an L53 parameter, a W7 parameter, an A18 parameter, and a W9 parameter. As shown in FIG. 4, the H30SJ parameter refers to a vertical distance between a SgRP and a heel point of a driver in a design state; the L1 parameter refers to an X-coordinate of a BOFRP; the L6 parameter refers to a distance between the BOFRP and a center of a steering wheel in an X-axis direction; the H8 parameter refers to a vertical height of an AHP; the A19 parameter refers to an inclination angle of a seat track line; the TL23 parameter refers to a horizontal adjustment stroke of an H point during normal driving; the H17 parameter refers to a distance between the AHP and the center of the steering wheel; the L53 parameter refers to a horizontal distance between a front SgRP and the AHP; the W7 parameter refers to a Y-coordinate of the center of the steering wheel; the A18 parameter refers to an inclination angle of the steering wheel; and the W9 parameter refers to a diameter of the steering wheel.

The AHP refers to an accelerator heel point; the H point refers to an intersection point of a torso line and a thigh line of a human body; the SgRP refers to a seating reference point; and the BOFRP refers to a ball of foot reference point.

The seat position information includes an X parameter and an H30 parameter, where the X parameter refers to a horizontal distance between the H point and a BOF point of the driver; and the H30 parameter refers to a vertical distance, predicted by a model, between the H point and the heel point of the driver.

The acquired driving posture data is preprocessed through the following steps: cluster the driving posture data; detect an outlier by calculation of a Euclidean distance between a sample point and a clustering center; and remove the outlier to obtain sampled driving posture data which is preprocessed.

In order to make scanned human body data be in a coordinate system of the whole automobile for later data extraction, the automobile is required to be scanned in advance. For the sake of high quality of a point cloud, current scanning is performed by combination of two scanning devices through the following steps:

(1) Scan a sample automobile with a Max-shot global photogrammeter to establish a coordinate system of the whole automobile;

(2) Scan the exterior and interior of the automobile with a hand-held laser scanning device of which a model is known as HandyScan 700 and accuracy reaches 0.002 mm, where detail features may be fully scanned by virtue of small size and flexible operation of the hand-held laser scanning device;

(3) Scan a human body with a Go! SCAN 3D scanner (Go scan) to achieve point cloud accuracy of 0.1 mm.

The data extraction is performed by establishment of the coordinate system of the whole automobile and measurement of a driving posture position (R point).

(1) Origin of the Coordinate System of the Whole Automobile

The origin of the coordinate system of the whole automobile is defined in the middle of a center line of a hostling front wheel.

(2) Directions of the Coordinate System of the Whole Automobile

The coordinate system of the whole automobile is defined in three-dimensional software as: an automobile head direction is opposite to an X-axis direction of the three-dimensional software, a Y-value of the driver is negative, and a Z-value of the driver is positive from bottom to top.

(3) Accuracy of the Coordinate System of the Whole Automobile

An error of a center point of a symmetrical hole in a chassis is required to be +/−2 mm, and a difference value of the symmetrical hole may be positive or negative, so that symmetry is guaranteed; section lines of an external surface and a mirror image of the external surface are measured with a step size of 400 mm; section lines of a column A, a column B, and a column C are required to be less than 1 mm, and section lines of the columns made from plastics are allowed to be less than 3 mm; and the external surface and the mirror image of the external surface are ought to be in a C shape.

(4) Actual Measurement of the R Point

A human body model of a person is built by a Human Builder according to measured values of the stature and weight of a real human body, and dummies respectively used in same sample automobiles are required to be identical.

An Initial position of each dummy is determined by a size, measured based on a general layout, of a main manned automobile. However, after a virtual dummy is configured to the point cloud, an overall position of the virtual dummy needs to be consistent with the point cloud as much as possible; that is, a Y-value of the R point may be slightly different from a value measured based on the general layout; and if so, an adjustment is performed.

Through adjustments on trends of knees and thighs of a dummy body in the point cloud, a thigh position and overall position of the virtual dummy are adjusted, so that the thighs of the virtual dummy are more exactly matched with positions for holding the thighs in the point cloud. A midpoint between rear end points of the thighs and on a center line of the virtual dummy is taken as the R point.

If X-values of the left knee and right knee in the point cloud are obviously different, the left knee is taken as final.

S120, Build a feature extraction model of the driving posture data of the automobile cab, and screen feature vectors playing a significant role in predicting a seat position by the feature extraction model.

The feature extraction model of the driving posture data of the automobile cab is built through the following steps: select features of the driving posture data through a Lasso regression algorithm; and screen, by cluster analysis based on correlation, the features selected through the Lasso regression algorithm.

During data processing in a case of high dimension and a large sample size, variable selection and feature screening are essential to be performed for data analysis. Because a support vector machine (SVM), a neural network, and other algorithms have difficulty in screening the feature vectors, the Lasso regression algorithm is adopted in the algorithm of the present disclosure for dimension reduction. Compared with other algorithms for variable screening, the Lasso regression algorithm has the following advantages: a model of multidimensional dependent variables may be built; and on the basis of optimization, a penalty term is added to reduce model coefficients, and coefficients of independent variable having a little influence on the dependent variables are reduced to be approximate to 0 or equal to 0, such that the variables are decreased. Accordingly, an acquisition cost is reduced, and the prediction model is simplified.

A Lasso estimation is defined as follows, where $x=\{x_{i1}, \ldots, x_{ip}\}$; $i=1, 2, \ldots N$, and i represents n groups of observed values of the variables; and the coefficients are denoted by $\beta$, and $\beta=\{\beta_1, \ldots, \beta_p\}^T$:

$$(\hat{\beta}_0, \hat{\beta}) = \mathrm{argmin}\left\{\sum_{i=1}^{n}\left(y_i - \beta_0 - \sum_{j=1}^{p}\beta_j x_{ij}\right)^2\right\} \text{ s.t.} \sum_{j=1}^{p}|\beta_j| \le t$$

When t is greater than or equal to t0, the optimal solution is $\hat{\beta}_j^0$; when the t is less than t0, partial results from the optimal solution may be reduced to be equal to 0, which means that corresponding variables are deleted from the model, and the rest of variables are retained. In this way, the variable screening and dimension reduction are achieved. All Lasso solutions may be obtained by changing a value of the t, and the optimal model may be selected by cross-validation.

The feature extraction model is built through Python, and main codes of the feature extraction model are shown as follows:

```
cv_ridge=pd.Series(cv_ridge,index=alphas)
cv_ridge.plot(title="Validation")
linreg=MultiTaskLassoCV( )
linreg.fit(X_train, Y_train).
```

The screened feature vectors playing a significant role in predicting the seat position include:

The gender parameter, the stature parameter, the weight parameter, the H30SJ parameter, the H8 parameter, and the L53 parameter.

S130, Build a prediction model of a comfortable seat position by a BP neural network, and input the screened feature vectors to perform training on the prediction model; where, detailed steps are as follows:

Adopt the screened feature vectors as data samples;

Randomly extract 70% of data samples as a training set of a fitting model, and adopt the remaining 30% of data samples as a testing set used for validating an error value of the fitting model; and Build a prediction model of a comfortable driving position by the BP neural network, where after traversal is performed, the optimal number of neurons on a hidden layer is 9; and train the prediction model of the comfortable driving position by taking the gender parameter, the stature parameter, the weight parameter, the H30SJ parameter, the H8 parameter, and the L53 parameter as input variables, taking the X parameter and the H30 parameter as output variables, and setting the number of the neurons on the hidden layer as 9, where when all the samples in the training are subjected to 26 rounds of forward and backward propagation, adjusted weights meet the requirement for reduction of the coefficients of the variables, and errors of the training set, the testing set, and a validation set are reduced to be on the order of 0.01.

Figures 5, 6:
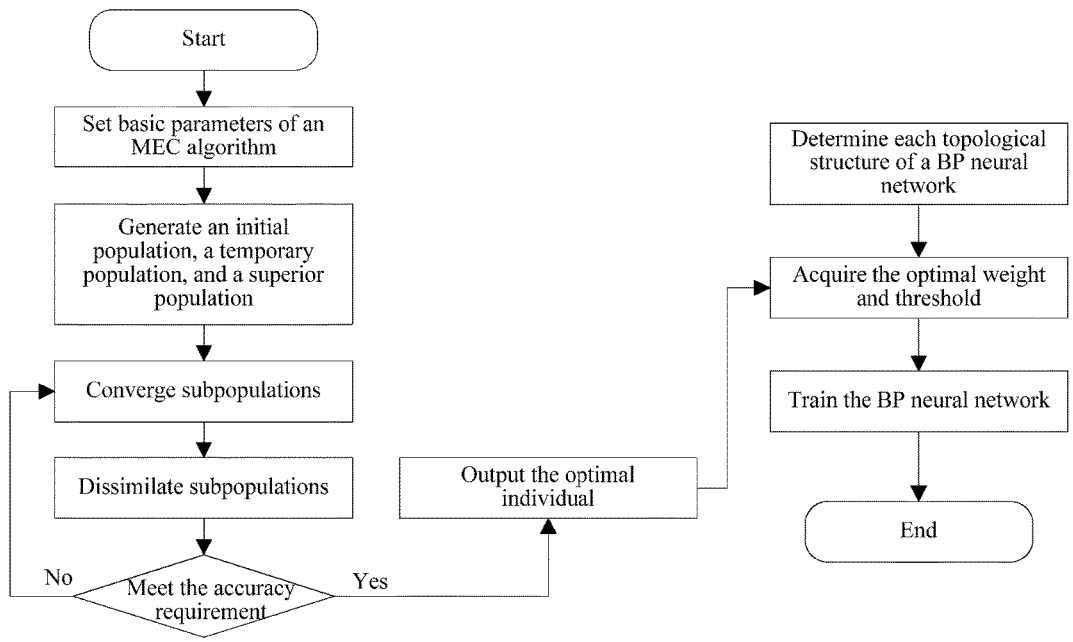
FIG. 5 is a schematic diagram showing information symbols and meanings of driving posture data in the embodiment of the present disclosure according to an embodiment of the disclosure.
FIG. 6 is a schematic diagram showing test results of a model in the algorithm for a data-driven intelligent adaptive model of an automobile cab based on a biometric identification technology in the embodiment of the present disclosure according to an embodiment of the disclosure.

Test results of the prediction model of the comfortable driving position are shown in FIG. 5.

The prediction model of the comfortable driving position is built through a Matlab, and codes of the prediction model of the comfortable driving position are shown as follows:

```
net=newff(Pn_train, Tn_train,S2)
net=train(net,Pn_train, Tn_train)
Tn_sim=sim(net,Pn_test).
```

Setting performed by the BP neural network on an initial value and a threshold value is susceptible, and is prone to generating a local optimum. In view of this, to further improve prediction accuracy of the BP neural network, appropriate initial value and threshold value are found through a mind evolutionary algorithm by simulating an evolutionary process of human thought; and moreover, the global optimum is found and brought into the prediction models built by the BP neural network. FIG. 6 shows a flow chart of learning optimized by the mind evolutionary algorithm.

Both MEC and the neural network have randomness to a certain extent. In view of this, to validate the optimization effect of the model, the data set is simulated and predicted for five times to work out mean values of both errors and standard deviations of the BP neural network as well as mean values of both errors and standard deviations of an MEC-BP neural network, as shown in FIG. 7.

The H30 parameter is respectively substituted into the SAE man-computer system and an equation of a driver selected seat position for a person to obtain an appropriate seat position (X-value). The algorithm of the present disclosure is validated and compared by 1191 validation sets to obtain sample errors shown in FIG. 8.

S140, Input specific feature vectors of the automobile cab to obtain the seat position information of the automobile cab and accordingly adjust the seat position; and detailed steps are as follows:

Acquire the gender parameter, the stature parameter, the weight parameter, the H30SJ parameter, the H8 parameter, and the L53 parameter of the driver in the automobile cab;

Input the gender parameter, the stature parameter, the weight parameter, the H30SJ parameter, the H8 parameter, and the L53 parameter of the driver in the automobile cab to the prediction model of the comfortable seat position to obtain the X parameter and the H30 parameter in the seat position information, where the prediction model of the comfortable seat position is built by the BP neural network; and acquire a comfortable vertical position parameter and a comfortable horizontal position parameter according to the X parameter and the H30 parameter; and Adjust the seat position in the automobile cab according to the comfortable vertical position parameter and the comfortable horizontal position parameter.

In the algorithm of the present disclosure, basic data of a person is selected, the driver information and the automobile man-computer parameter information are comprehensively considered, and the prediction model of the comfortable seat position is rebuilt, so that prediction and adjustments on comfortable positions of different drivers are achieved. The algorithm of the present disclosure has high degree of self-definition and may meet different requirements for driving, thus guaranteeing the driving comfort and the driving safety.

Embodiment 2

Figure 2:
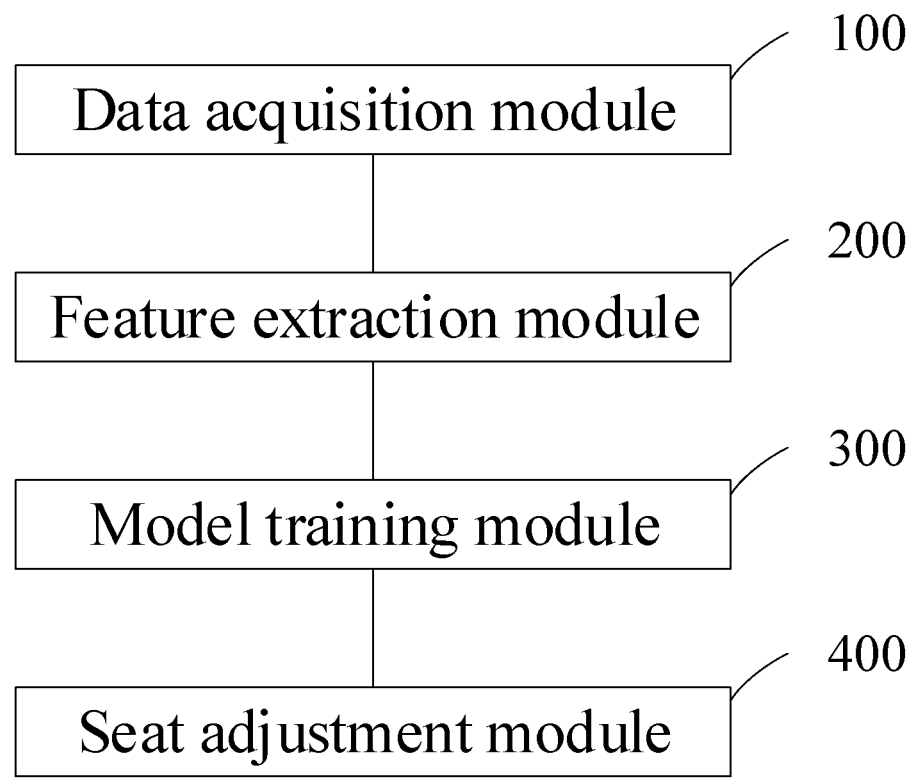
FIG. 2 is a structured block diagram of a self-adaptive adjustment device for an automobile cab in an embodiment of the present disclosure according to an embodiment of the disclosure.

This embodiment further provides a self-adaptive adjustment device for an automobile cab. As shown in FIG. 2, the self-adaptive adjustment device for an automobile cab includes:

A data acquisition module 100 used for acquiring driving posture data of an automobile cab, where the driving posture data includes driver information, automobile man-computer parameter information, and seat position information;

A feature extraction module 200 used for building a feature extraction model of the driving posture data of the automobile cab and screening feature vectors playing a significant role in predicting a seat position by the feature extraction model;

A model training module 300 used for building a prediction model of a comfortable seat position by a BP neural network and inputting the screened feature vectors to perform training on the prediction model; and A seat adjustment module 400 used for inputting specific feature vectors of the automobile cab to obtain the seat position information of the automobile cab and accordingly adjust the seat position.

Various embodiments of the disclosure may have one or more of the following effects. In some embodiments, the present disclosure may provide an algorithm for a data-driven intelligent adaptive model of an automobile cab based on a biometric identification technology to improve the matching degree between a person and a comfortable driving position, adjusted by the existing system, of an automobile cab. In other embodiments, when compared with the prior art, the algorithm for a data-driven intelligent adaptive model of an automobile cab based on a biometric identification technology of the present disclosure may have the following advantages: basic data of a person is selected, the driver information and the automobile man-computer parameter information are comprehensively considered, and the prediction model of the comfortable seat position is rebuilt, so that prediction and adjustments on comfortable positions of different drivers are achieved. The algorithm of the present disclosure may have high degree of self-definition and may meet different requirements for driving, thus guaranteeing the driving comfort and the driving safety.

It should be understood that in the description of the present disclosure, terms such as "central", "longitudinal", "transverse" "upper", "lower", "front", "rear", "left", "right" "vertical", "horizontal", "top", "bottom", "inside" and "outside" indicate the orientation or positional relationships based on the drawings. They are merely intended to facilitate and simplify the description of the present disclosure, rather than to indicate or imply that the mentioned device or components must have a specific orientation or must be constructed and operated in a specific orientation. Therefore, these terms should not be construed as a limitation to the present disclosure. Moreover, the terms such as "first" and "second" are used only for the purpose of description and cannot be understood as indicating or implying relative importance or implicitly indicating the number of technical features denoted. Thus, features defined with "first" and "second" may explicitly or implicitly include one or more of the features. In the description of the present disclosure, unless otherwise specifically defined, "a plurality of" means two or more.

In the description of the present disclosure, it should be noted that, unless otherwise clearly specified and defined, meanings of terms "install", "connect with", and "connect to" should be understood in a board sense. For example, the connection may be a fixed connection, a detachable connection, or an integral connection; may be a mechanical connection or an electrical connection; may be a direct connection or an indirect connection with use of an intermediate medium; or may be intercommunication between two components. A person of ordinary skill in the art may understand specific meanings of the above terms in the present disclosure based on a specific situation.

The above described are merely preferred embodiments of the present disclosure, and are not intended to limit the present disclosure. Any modification, equivalent substitution and improvement without departing from the spirit and principle of the present disclosure should be included within the protection scope of the present disclosure.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. An algorithm for a data-driven intelligent adaptive model of an automobile cab based on a biometric identification technology, comprising:
    acquiring driving posture data, the driving posture data comprising driver information, automobile man-computer parameter information, and seat position information;
    building a feature extraction model of the driving posture data and screening feature vectors playing a significant role in predicting a seat position by the feature extraction model;
    building a prediction model of a comfortable seat position by a back propagation (BP) neural network and inputting the screened feature vectors to perform training on the prediction model;
    inputting specific feature vectors to obtain the seat position information and accordingly adjust the seat position; and
    wherein the acquired driving posture data is preprocessed through following steps:
        clustering the driving posture data;
        detecting an outlier by calculating a Euclidean distance between a sample point and a clustering center; and
        removing the outlier to obtain preprocessed sampled driving posture data.

2. The algorithm according to claim 1, wherein:
    the driver information comprises a gender parameter, a stature parameter, an age parameter, and a weight parameter; and
    the automobile man-computer parameter information comprises a first parameter,
    a second parameter, a third parameter, a fourth parameter, a fifth parameter, a sixth parameter, a seventh parameter, an eighth parameter, a ninth parameter, a tenth parameter, and an eleventh parameter;
    wherein:
        the first parameter represents a vertical distance between a seating reference point and a heel point of a driver in a design state;
        the second parameter represents an X-coordinate of a ball of foot reference point;
        the third parameter represents a distance between the ball of foot reference point and a center of a steering wheel in an X-axis direction;
        the fourth parameter represents a vertical height of an accelerator heel point;
        the fifth parameter represents an inclination angle of a seat track line;
        the sixth parameter represents a horizontal adjustment stroke of an intersection point of a torso line and a thigh line of a human body during normal driving;
        the seventh parameter represents a distance between the accelerator heel point and the center of the steering wheel;
        the eighth parameter represents a horizontal distance between a front seating reference point and the accelerator heel point;
        the ninth parameter represents a Y-coordinate of the center of the steering wheel;

the tenth parameter represents an inclination angle of the steering wheel;

the eleventh parameter represents a diameter of the steering wheel; and the seat position information comprises a twelfth parameter and a thirteenth parameter, wherein:

the twelfth parameter represents a horizontal distance between the intersection point of a torso line and a thigh line of a human body and the ball of foot reference point of the driver; and the thirteenth parameter represents a vertical distance, predicted by a model, between the intersection point of a torso line and a thigh line of a human body and a heel point of the driver.

3. The algorithm according to claim 1, wherein the step of building the feature extraction model of the driving posture data comprises:

selecting features of the driving posture data through a least absolute shrinkage and selection operator (Lasso) regression algorithm; and screening, by cluster analysis based on correlation, the features selected through the Lasso regression algorithm.

4. The algorithm according to claim 3, wherein the screened feature vectors playing the significant role in predicting the seat position comprise: a gender parameter, a stature parameter, a weight parameter, a first parameter, a fourth parameter, and an eighth parameter.

5. The algorithm according to claim 4, wherein the step of building the prediction model of the comfortable seat position by the BP neural network and inputting the screened feature vectors to perform training on the prediction model comprises:

adopting the screened feature vectors as data samples;

randomly extracting 70% of data samples as a training set of a fitting model and adopting remaining 30% of data samples as a testing set for validating an error value of the fitting model; and building a prediction model of a comfortable driving position by the BP neural network, wherein after traversal is performed, an optimal number of neurons on a hidden layer is 9; and training the prediction model of the comfortable driving position by taking the gender parameter, the stature parameter, the weight parameter, the first parameter, the fourth parameter, and the eighth parameter as input variables, taking a twelfth parameter and a thirteenth parameter as output variables, and setting the number of the neurons on the hidden layer as 9, wherein when all the samples in the training are subjected to 26 rounds of forward and backward propagation, adjusted weights meet a requirement for reduction of coefficients of the variables, and errors of the training set, the testing set, and a validation set are reduced to be on the order of 0.01.

6. The algorithm according to claim 5, wherein the step of inputting specific feature vectors to obtain the seat position information and accordingly adjust the seat position comprises:

acquiring the gender parameter, the stature parameter, the weight parameter, the first parameter, the fourth parameter, and the eighth parameter of the driver;

inputting the gender parameter, the stature parameter, the weight parameter, the first parameter, the fourth parameter, and the eighth parameter of the driver to the prediction model of the comfortable seat position to obtain the twelfth parameter and the thirteenth parameter in the seat position information, wherein the prediction model of the comfortable seat position is built by the BP neural network, and acquiring a comfortable vertical position parameter and a comfortable horizontal position parameter according to the twelfth parameter and the thirteenth parameter; and adjusting the seat position according to the comfortable vertical position parameter and the comfortable horizontal position parameter.

7. An algorithm for a data-driven intelligent adaptive model of an automobile cab based on a biometric identification technology, comprising:

acquiring driving posture data, the driving posture data comprising driver information, automobile man-computer parameter information, and seat position information;

building a feature extraction model of the driving posture data and screening feature vectors playing a significant role in predicting a seat position by the feature extraction model;

building a prediction model of a comfortable seat position by a back propagation (BP) neural network and inputting the screened feature vectors to perform training on the prediction model; and inputting specific feature vectors to obtain the seat position information and accordingly adjust the seat position;

wherein the step of building the feature extraction model of the driving posture data comprises:

selecting features of the driving posture data through a least absolute shrinkage and selection operator (Lasso) regression algorithm; and screening, by cluster analysis based on correlation, the features selected through the Lasso regression algorithm.

8. The algorithm according to claim 7, wherein:

the driver information comprises a gender parameter, a stature parameter, an age parameter, and a weight parameter;

the automobile man-computer parameter information comprises a first parameter, a second parameter, a third parameter, a fourth parameter, a fifth parameter, a sixth parameter, a seventh parameter, an eighth parameter, a ninth parameter, a tenth parameter, and an eleventh parameter; and wherein:

the first parameter represents a vertical distance between a seating reference point and a heel point of a driver in a design state;

the second parameter represents an X-coordinate of a ball of foot reference point;

the third parameter represents a distance between the ball of foot reference point and a center of a steering wheel in an X-axis direction;

the fourth parameter represents a vertical height of an accelerator heel point;

the fifth parameter represents an inclination angle of a seat track line;

the sixth parameter represents a horizontal adjustment stroke of an intersection point of a torso line and a thigh line of a human body during normal driving;

the seventh parameter represents a distance between the accelerator heel point and the center of the steering wheel;

the eighth parameter represents a horizontal distance between a front seating reference point and the accelerator heel point;

the ninth parameter represents a Y-coordinate of the center of the steering wheel;

the tenth parameter represents an inclination angle of the steering wheel;

the eleventh parameter represents a diameter of the steering wheel; and the seat position information comprises a twelfth parameter and a thirteenth parameter, wherein:

the twelfth parameter represents a horizontal distance between the intersection point of a torso line and a thigh line of a human body and the ball of foot reference point of the driver; and the thirteenth parameter represents a vertical distance, predicted by a model, between the intersection point of a torso line and a thigh line of a human body and a heel point of the driver.

9. The algorithm according to claim 8, wherein the acquired driving posture data is preprocessed through following steps:

clustering the driving posture data;

detecting an outlier by calculating a Euclidean distance between a sample point and a clustering center; and removing the outlier to obtain preprocessed sampled driving posture data.

10. The algorithm according to claim 7, wherein the screened feature vectors playing the significant role in predicting the seat position comprise: a gender parameter, a stature parameter, a weight parameter, a first parameter, a fourth parameter, and an eighth parameter.

11. The algorithm according to claim 10, wherein the step of building the prediction model of the comfortable seat position by the BP neural network and inputting the screened feature vectors to perform training on the prediction model comprises:

adopting the screened feature vectors as data samples;

randomly extracting 70% of data samples as a training set of a fitting model and adopting remaining 30% of data samples as a testing set for validating an error value of the fitting model; and building a prediction model of a comfortable driving position by the BP neural network, wherein after traversal is performed, an optimal number of neurons on a hidden layer is 9; and training the prediction model of the comfortable driving position by taking the gender parameter, the stature parameter, the weight parameter, the first parameter, the fourth parameter, and the eighth parameter as input variables, taking a twelfth parameter and a thirteenth parameter as output variables, and setting the number of the neurons on the hidden layer as 9, wherein when all the samples in the training are subjected to 26 rounds of forward and backward propagation, adjusted weights meet a requirement for reduction of coefficients of the variables, and errors of the training set, the testing set, and a validation set are reduced to be on the order of 0.01.

12. The algorithm according to claim 11, wherein the step of inputting specific feature vectors to obtain the seat position information and accordingly adjust the seat position comprises:

acquiring the gender parameter, the stature parameter, the weight parameter, the first parameter, the fourth parameter, and the eighth parameter of the driver;

inputting the gender parameter, the stature parameter, the weight parameter, the first parameter, the fourth parameter, and the eighth parameter of the driver to the prediction model of the comfortable seat position to obtain the twelfth parameter and the thirteenth parameter in the seat position information, wherein the prediction model of the comfortable seat position is built by the BP neural network, and acquiring a comfortable vertical position parameter and a comfortable horizontal position parameter according to the twelfth parameter and the thirteenth parameter; and adjusting the seat position according to the comfortable vertical position parameter and the comfortable horizontal position parameter.

13. An algorithm for a data-driven intelligent adaptive model of an automobile cab based on a biometric identification technology, comprising:

acquiring driving posture data, the driving posture data comprising driver information, automobile man-computer parameter information, and seat position information;

building a feature extraction model of the driving posture data and screening feature vectors playing a significant role in predicting a seat position by the feature extraction model;

building a prediction model of a comfortable seat position by a back propagation (BP) neural network and inputting the screened feature vectors to perform training on the prediction model;

inputting specific feature vectors to obtain the seat position information and accordingly adjust the seat position;

wherein the screened feature vectors playing the significant role in predicting the seat position comprise: a gender parameter, a stature parameter, a weight parameter, a first parameter, a fourth parameter, and an eighth parameter;

wherein the first parameter represents a vertical distance between a seating reference point and a heel point of a driver in a design state;

the fourth parameter represents a vertical height of an accelerator heel point;

the eighth parameter represents a horizontal distance between a front seating reference point and the accelerator heel point;

wherein the step of building the prediction model of the comfortable seat position by the BP neural network and inputting the screened feature vectors to perform training on the prediction model comprises:

adopting the screened feature vectors as data samples;

randomly extracting 70% of data samples as a training set of a fitting model and adopting remaining 30% of data samples as a testing set for validating an error value of the fitting model; and building a prediction model of a comfortable driving position by the BP neural network, wherein after traversal is performed, an optimal number of neurons on a hidden layer is 9; and training the prediction model of the comfortable driving position by taking the gender parameter, the stature parameter, the weight parameter, the first parameter, the fourth parameter, and the eighth parameter as input variables, taking a twelfth parameter and a thirteenth parameter as output variables, and setting the number of the neurons on the hidden layer as 9, wherein when all the samples in the training are subjected to 26 rounds of forward and backward propagation, adjusted weights meet a requirement for reduction of coefficients of the variables, and errors of the training set, the testing set, and a validation set are reduced to be on the order of 0.01;

wherein the twelfth parameter represents a horizontal distance between an intersection point of a torso line and a thigh line of a human body and a ball of foot reference point of the driver; and the thirteenth parameter represents a vertical distance, predicted by a model, between the intersection point of a torso line and a thigh line of a human body and a heel point of the driver.

14. The algorithm according to claim 13, wherein:

the driver information comprises a gender parameter, a stature parameter, an age parameter, and a weight parameter; and the automobile man-computer parameter information comprises the first parameter, a second parameter, a third parameter, the fourth parameter, a fifth parameter, a sixth parameter, a seventh parameter, the eighth parameter, a ninth parameter, a tenth parameter, and an eleventh parameter; and wherein:
- the second parameter represents an X-coordinate of the ball of foot reference point;
- the third parameter represents a distance between the ball of foot reference point and a center of a steering wheel in an X-axis direction;
- the fifth parameter represents an inclination angle of a seat track line;
- the sixth parameter represents a horizontal adjustment stroke of the intersection point of a torso line and a thigh line of a human body during normal driving;
- the seventh parameter represents a distance between the accelerator heel point and the center of the steering wheel;
- the ninth parameter represents a Y-coordinate of the center of the steering wheel;
- the tenth parameter represents an inclination angle of the steering wheel;
- the eleventh parameter represents a diameter of the steering wheel; and
- the seat position information comprises the twelfth parameter and the thirteenth parameter.

15. The algorithm according to claim 14, wherein the acquired driving posture data is preprocessed through following steps:

clustering the driving posture data;

detecting an outlier by calculating a Euclidean distance between a sample point and a clustering center; and removing the outlier to obtain preprocessed sampled driving posture data.

16. The algorithm according to claim 15, wherein the step of building the feature extraction model of the driving posture data comprises:

selecting features of the driving posture data through a least absolute shrinkage and selection operator (Lasso) regression algorithm; and screening, by cluster analysis based on correlation, the features selected through the Lasso regression algorithm.

17. The algorithm according to claim 13, wherein the step of inputting specific feature vectors to obtain the seat position information and accordingly adjust the seat position comprises:

acquiring the gender parameter, the stature parameter, the weight parameter, the first parameter, the fourth parameter, and the eighth parameter of the driver;

inputting the gender parameter, the stature parameter, the weight parameter, the first parameter, the fourth parameter, and the eighth parameter of the driver to the prediction model of the comfortable seat position to obtain the twelfth parameter and the thirteenth parameter in the seat position information, wherein the prediction model of the comfortable seat position is built by the BP neural network, and acquiring a comfortable vertical position parameter and a comfortable horizontal position parameter according to the twelfth parameter and the thirteenth parameter; and adjusting the seat position according to the comfortable vertical position parameter and the comfortable horizontal position parameter.

* * * * *